No. 831,105. PATENTED SEPT. 18, 1906.
J. J. ROBERTSON.
HOG AND CATTLE HOLDER.
APPLICATION FILED APR. 24, 1906.

2 SHEETS—SHEET 1.

Witnesses
Howard D. Orr.
J. F. Riley

John J. Robertson,
Inventor,
By E. G. Siggers.
Attorney

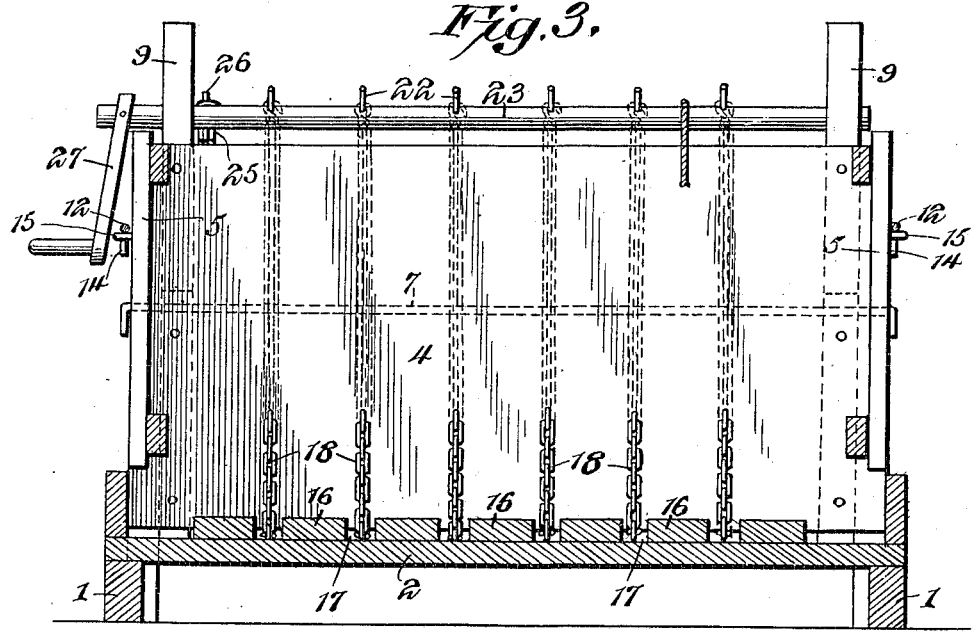
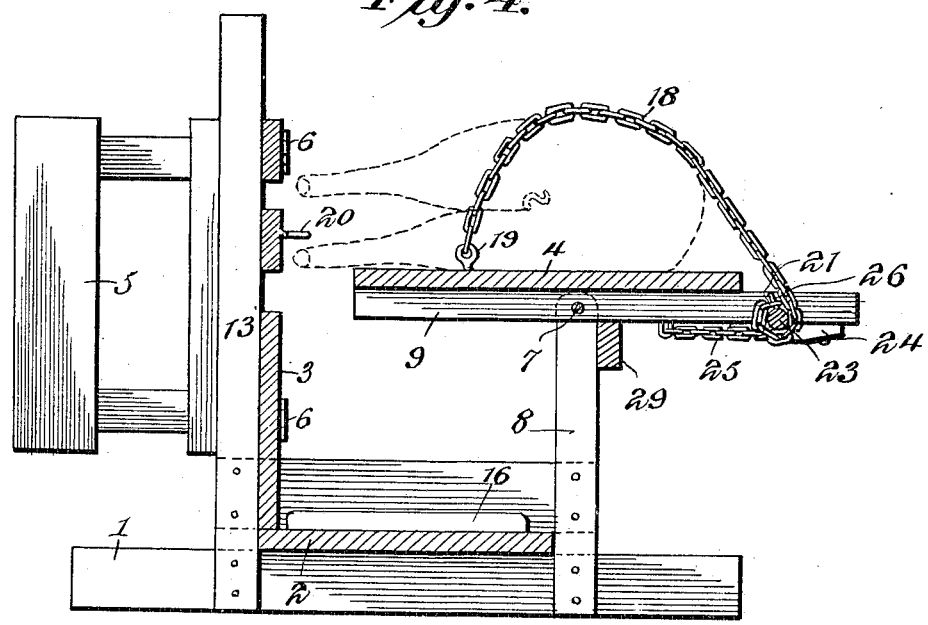

UNITED STATES PATENT OFFICE.

JOHN J. ROBERTSON, OF WASHINGTON COUNTY, INDIANA.

HOG AND CATTLE HOLDER.

No. 831,105.  Specification of Letters Patent.  Patented Sept. 18, 1906.

Application filed April 24, 1906. Serial No. 313,473.

*To all whom it may concern:*

Be it known that I, JOHN J. ROBERTSON, a citizen of the United States, residing in the county of Washington and State of Indiana, have invented a new and useful Hog and Cattle Holder, of which the following is a specification.

The invention relates to a hog and cattle holder.

The object of the present invention is to improve the construction of devices for holding animals, and to provide a simple and comparatively inexpensive hog and cattle holder adapted to enable one man to hold a hog of any size with great ease and without causing the animal to exert or strain itself when marking, ringing, castrating, or otherwise operating on such animal.

With these and other objects in view the invention consists in the construction and novel combination of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

Figure 1:
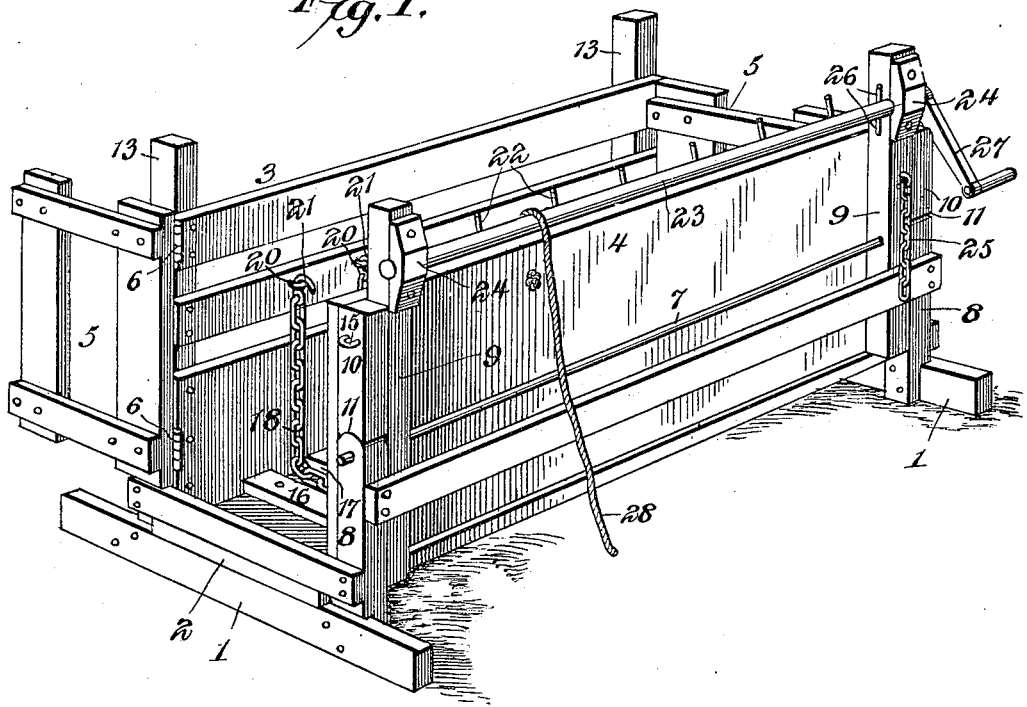
Figure 2:
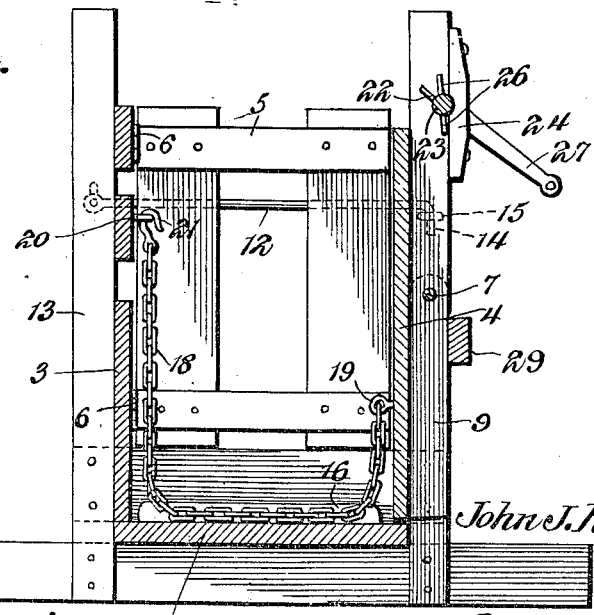

In the drawings, Figure 1 is a perspective view of a hog and cattle holder constructed in accordance with this invention. Fig. 2 is a transverse sectional view. Fig. 3 is a longitudinal sectional view. Fig. 4 is a transverse sectional view, the pivoted side being arranged in a horizontal position to form an operating-table.

Like numerals of reference designate corresponding parts throughout the several figures of the drawings.

The hog and cattle holder is provided with a substantially oblong frame, provided with supporting-sills 1 and provided with a rigid horizontal bottom 2, a fixed side 3, and a pivoted side 4, which is adapted to be swung from the vertical position (shown in Figs. 1 and 2) to the horizontal position (shown in Fig. 4) to form an operating-table and which is rigidly held in a vertical position by means of doors or gates 5. The fixed side of the frame may be of any preferred construction, and the doors or gates 5 are connected to the fixed side 3 by means of suitable hinges 6.

The movable side 4 is pivoted by a horizontal longitudinal rod 7 to the upper ends of a pair of short corner-posts 8, which are suitably secured to the frame. The side 4 is provided with cleats or bars 9, which are arranged contiguous to the short posts and which are pierced by the longitudinal pintle-rod 7. The upper ends of the short posts 8 are rounded, and the pivoted side 4 is provided at its upper portion with short bars 10, having lower concaved edges 11, which fit against the upper rounded ends of the post 9 to form bearings for the pivoted side for relieving the pintle-rod of strain. The pintle-rod is located at a point between the upper and lower edges of the movable side 4, and the latter is rigidly held in its vertical position by means of the hinged doors or gates 5, which when closed fit between the sides 3 and 4 and engage the pivoted side above and below the pintle-rod.

The doors or gates are locked in their closed position by means of rods 12, hinged at one end to the adjacent corner-post 13 of the fixed side 3 and provided at the other end with a bent portion or hook 14, which fits in an eye formed by a staple 15 of the movable side 4. The locking-rods are located above the pintle-rods, and they serve to connect the sides 3 and 4 and assist in holding the pivotal side stationary while a hog or other animal is being secured, as hereinafter explained.

The bottom of the frame is provided with a plurality of transverse cleats or bars 16, which are spaced apart to form transverse grooves 17 for the reception of chains 18 or other flexible connections, such as ropes or the like. The chains 18 are secured at one end by eyes 19 or other suitable means to the inner face of the movable side at points below the pintle-rod, and the fixed side 3 is provided at its inner face with a plurality of eyes 20, which are adapted to be engaged by hooks 21 of the chains 18. The chains lie in the grooves at the bottom of the frame and against the sides of the same in the position illustrated in Fig. 2 of the drawings. The transverse cleats protect the chains and prevent the same from becoming tangled in the feet of a hog or other animal.

When it is desired to operate on a hog or other animal, one of the gates is opened, and the hog is driven into the frame. The gate is then closed to confine the animal in the frame. The chains are then unhooked from the eyes 20 and are engaged with projections or pins 22 of a windlass-shaft 23, which is journaled in suitable bearings 24 of the bars or cleats 9 and which is located in a plane slightly above the upper edge of the pivoted side 4. The windlass-shaft is held against accidental rotary movement by means of a short chain 25, which is fixed at one end to the pivoted side and which is adapted to engage either of a pair of projections 26. The projections 26 are preferably formed by a pin which pierces the windlass-shaft. After all the chains 18 are connected with the windlass-shaft the latter is rotated to tighten the said chains 18, which lift the hog off its feet and bind the same tightly against the pivoted side 4. It has been found by experience that when a hog is lifted off its feet in this manner it will cease to exert or strain itself.

The windlass-shaft is provided at one end with a crank-handle 27, and it is locked by the short chain 25 to retain the animal on the pivoted side. The pivoted side of the frame is also provided with a short rope 28 or other suitable flexible connection, which is secured at one end to the upper portion of the pivoted side and which is adapted to be fastened to one of the hind legs of a hog for holding the latter in position to be operated on. When the animal is on the operating-table formed by the pivoted side and in the position illustrated in dotted lines in Fig. 4 of the drawings, it may be conveniently operated on for any purpose. When the pivoted side is arranged in a horizontal position, as illustrated in Fig. 4 of the drawings, it rests upon a horizontal bar 29, which forms a stop for the pivoted side and also serves to brace the short posts 8. After the hog or other animal is operated on the pivoted side is returned to a vertical position and the animal is released.

It will be seen that the hog and cattle holder will enable a hog of any size to be easily handled by one person and that an animal is not permitted to strain itself.

Having thus fully described my invention, what I claim as new, and desire to secure by Letters Patent, is—

1. A device of the class described, comprising a frame having a movable side pivoted at a point between its upper and lower edges and adapted to be swung outward to form an operating-table, a door or gate arranged to abut against the movable side above and below the pivotal point for holding the same stationary, and means for securing an animal to the movable side.

2. A device of the class described, comprising a frame having a movable side pivoted at a point between its upper and lower edges and adapted to be arranged to form an operating-table, means for securing an animal to the pivoted side, a hinged door or gate arranged to abut against the movable side above and below the pivotal point for holding the said side stationary, and a locking device for securing the door or gate in its closed position, said locking device being also connected with the movable side.

3. A device of the class described, comprising a frame having a movable side pivoted at a point between its upper and lower edges and adapted to be arranged to form an operating-table, means for securing an animal to the pivoted side, a hinged door or gate arranged to abut against the movable side above and below the pivotal point for holding the said side stationary, and a locking device for securing the door or gate in its closed position, said locking device consisting of a transverse rod extending across the frame, and detachably connected with the movable side.

4. A device of the class described, comprising a frame having fixed and movable sides, the movable side being adapted to be swung outward to form an operating-table, a plurality of flexible connections secured at one end to the movable side, means for detachably connecting the flexible connections with the other side of the frame, and means carried by the movable side for enabling the flexible connections to be attached to it for securing an animal.

5. A device of the class described, comprising a frame provided with transverse bottom grooves and having fixed and movable sides, the movable side being adapted to form an operating-table, a plurality of flexible connections secured at one end to the movable side and extending across the bottom of the frame and lying in the grooves thereof, said flexible connections being also detachably secured to the fixed side, and means carried by the movable side to receive the free ends of the flexible connections for securing the animal to the said movable side.

6. A device of the class described, comprising a frame provided with transverse bottom grooves and having fixed and movable sides, the movable side being adapted to form an operating-table, a plurality of flexible connections secured at one end to the movable side and extending across the bottom of the frame and lying in the grooves thereof, said flexible connections being also detachably secured to the fixed side, and a windlass mounted on the movable side and provided with means for connecting the free ends of the flexible connections to it for enabling the flexible connections to be simultaneously wound up for securing an animal on the movable side.

7. A device of the class described comprising a frame having fixed and movable sides, the movable side being adapted to be swung outward to form an operating-table, a plurality of flexible connections secured at one end to the movable side, means for detachably connecting the flexible connections with the other side of the frame, and a windlass mounted on the movable side and provided with means for connecting the free ends of the flexible connections to it for enabling the flexible connections to be simultaneously wound up for securing an animal on the movable side.

In testimony that I claim the foregoing as my own I have hereto affixed my signature in the presence of two witnesses.

JOHN J. ROBERTSON.

Witnesses:
 ENOCH B. DIXON,
 C. O. ROBERTSON.